(12) United States Patent
Nishida

(10) Patent No.: US 7,661,825 B2
(45) Date of Patent: Feb. 16, 2010

(54) PROJECTOR HAVING HORIZONTAL DISPLACEMENT SENSORS FOR CORRECTING DISTORTION

(75) Inventor: Michiya Nishida, Tokyo (JP)

(73) Assignee: NEC Viewtechnology, Ltd., Tokyo (JP)

( * ) Notice: Subject to any disclaimer, the term of this patent is extended or adjusted under 35 U.S.C. 154(b) by 572 days.

(21) Appl. No.: 11/447,881

(22) Filed: Jun. 7, 2006

(65) Prior Publication Data

US 2006/0290896 A1   Dec. 28, 2006

(30) Foreign Application Priority Data

Jun. 23, 2005   (JP) .............................. 2005-183554

(51) Int. Cl.
*G03B 21/14* (2006.01)
*G01P 15/00* (2006.01)

(52) U.S. Cl. ...................................... 353/69; 73/514.01

(58) Field of Classification Search ................... 353/69, 353/70, 101, 122; 348/745, 806; 396/53; 73/514.01
See application file for complete search history.

(56) References Cited

U.S. PATENT DOCUMENTS

| | | | |
|---|---|---|---|
| 6,862,086 B2 * | 3/2005 | Kanemitsu | 356/139.1 |
| 6,886,946 B2 * | 5/2005 | Eguchi | 353/101 |
| 6,974,217 B2 * | 12/2005 | Kimura et al. | 353/69 |
| 7,204,595 B2 * | 4/2007 | Tamura | 353/69 |
| 7,209,225 B2 * | 4/2007 | Inoue | 356/138 |
| 7,213,926 B2 * | 5/2007 | May et al. | 353/69 |
| 2003/0223049 A1 * | 12/2003 | Ohara | 353/101 |
| 2004/0125364 A1 * | 7/2004 | Kanemitsu | 356/139.03 |
| 2005/0012907 A1 * | 1/2005 | Inoue | 353/70 |
| 2005/0099607 A1 * | 5/2005 | Yokote et al. | 353/43 |
| 2006/0256298 A1 * | 11/2006 | Knipe | 353/69 |

FOREIGN PATENT DOCUMENTS

| | | |
|---|---|---|
| JP | 4-127198 | 4/1992 |
| JP | 4-204059 | 7/1992 |
| JP | 6-189236 | 7/1994 |
| JP | 7-124156 | 5/1995 |
| JP | 10-93984 | 4/1998 |

(Continued)

OTHER PUBLICATIONS

Chinese Office Action dated Sep. 19, 2008 (including English language translation).

(Continued)

*Primary Examiner*—William C Dowling
*Assistant Examiner*—Ryan Howard
(74) *Attorney, Agent, or Firm*—McGinn IP Law Group PLLC

(57) ABSTRACT

A projector apparatus has a projection device for projecting an image onto a projection surface; at least two displacement sensors for detecting horizontal displacements of the projector apparatus, the displacement sensors being spaced a predetermined distance from each other; a rotational angle calculator for calculating a rotational angle of the projector apparatus in a horizontal plane using the predetermined distance and the horizontal displacements, the horizontal displacements being detected by the displacement sensors; and a distortion corrector for correcting distortion of the image by using the rotational angle, the image being projected by the projection device, wherein the rotational angle is calculated by the rotational angle calculator as a horizontal corrective angle.

20 Claims, 7 Drawing Sheets

FOREIGN PATENT DOCUMENTS

| | | |
|---|---|---|
| JP | 10-111533 | 4/1998 |
| JP | 2002-44571 | 2/2002 |
| JP | 3519393 | 7/2003 |
| JP | 3574108 | 7/2003 |
| JP | 2003-348499 | 12/2003 |
| JP | 2004-29356 | 1/2004 |
| JP | 2004-77545 | 3/2004 |
| JP | 2005-077994 | 3/2005 |
| JP | 2005-165207 | 6/2005 |

OTHER PUBLICATIONS

Japanese Office Action dated May 12, 2009 with partial English-Language translation.

Japanese Office Action issued Aug. 19, 2009 in Japanese Patent Application No. 2005-183554 (English-language translation).

* cited by examiner

PROJECTOR HAVING HORIZONTAL DISPLACEMENT SENSORS FOR CORRECTING DISTORTION

The present application is based on, and claims priority from, J.P. Application No. 2005-183554, filed on Jun. 23, 2005, the disclosure of which is hereby incorporated by reference herein in its entirety.

BACKGROUND OF THE INVENTION

1. Field of the Invention

The present invention relates to a projector, and more particularly to a projector having a function to correct distortion of an image that is projected obliquely onto a screen.

2. Description of the Related Art

Projectors that employ image forming devices, such as liquid crystal light valves, digital micromirror devices, or the like, which are arranged to produce a light beam that is modulated based on an image signal and to project the modulated light beam onto a screen at an enlarged scale, have been widely used for the purposes of presentations and other image display occasions.

In actual applications of projectors, a projector is often installed below the central axis of a projection surface onto which images are to be projected from the projector so that the projector does not obstruct the eyesight of viewers. Therefore, a projector is designed such that when the projector is installed such that the central line of a projection lens (projection optical axis) of the projector extends perpendicularly to the projection surface in a horizontal plane, an image, which is projected from the projector onto the projection surface, is positioned upwardly of the projection optical axis, and is displayed in a rectangular shape that is similar to the shape of the display surface of a display device in the projector. The angle that is defined by the plane in which a projector is installed and the line that interconnects the center of the projection lens and the center of the projected image is referred to as "upward angle". The upward angle is formed by shifting the location where the projection lens is mounted in a vertical direction with respect to the central line of the display device. Projection of an image using a projector which is installed at an upward angle and then tilted vertically or rotated horizontally is referred to as "swing-and-tilt projection".

FIG. 1 schematically shows an image that is projected at an upward angle alone, an image that is projected at a vertical swing-and-tilt projection angle, and an image that is projected at a horizontal swing-and-tilt projection angle. When an image is projected at an upward angle, rectangular projected image 91 is displayed. When the projector is tilted vertically upwardly for swing-and-tilt projection, rectangular projected image 91 is changed to projected image 92 that has an inverted trapezoidal distortion. However, the inverted trapezoidal distortion in projected image 92 can easily be corrected, because the left side and the right side are equally distorted. When the projector is then rotated horizontally for swing-and-tilt projection, in addition to the vertically upward tilting, and the projection optical axis is tilted at an angle other than the right angle with respect to the projection surface in the horizontal plane, projected image 92 is changed to projected image 93 having a distorted quadrangular shape rather than a simple trapezoidal distortion, because of the upward angle.

In order to correct the distortion of a projected image, highly sophisticated technologies are required for the components of a projector. Various technological efforts have been made to enable easy correction of the distortion. For example, Japanese Patent No. 3519393 discloses a projector having a means for measuring a vertical angle and an adjustment ring to correct the distortion of an image when the image is projected obliquely. Japanese Patent Laid-open Publication No. 2002-044571 discloses a technology for easily correcting the distortion of an image by pointing to four corners of an image using the frame of a projection screen as a reference, when the image is projected obliquely onto the screen.

According to the projector disclosed in Japanese Patent No. 3519393, a trapezoidal distortion can automatically be corrected because a vertical tilt of the projector is acquired by an acceleration sensor. However, when an image is projected from the projector at a horizontal swing-and-tilt angle, an operator has to operate the adjustment ring through a visual process to correct the distortion that is caused by the oblique projection of the image. If the horizontal swing-and-tilt angle is small, then it is possible to make adjustments according to a predetermined procedure. However, if the horizontal swing-and-tilt angle is as large as, for example, about 30 degrees, then it becomes difficult for the operator to properly correct the distortion using the adjustment ring, because the operator, who makes visual adjustments near the projector, is unable to recognize the rectangular image properly when he looks at the projected image from near the projector because of the large horizontal swing-and-tilt angle. Consequently, the operator has to confirm whether the correction is appropriate or not from a position that is right in front of the projection surface each time an adjustment is made, or he has to make adjustments while being informed of the state of the image by another person who is standing right in front of the projection surface.

According to the technology disclosed in Japanese Patent Laid-open Publication No. 2002-044571, if a screen or the like is installed, then the corners of an image that is to be corrected can be specified based on the frame of the screen. Therefore, this technology is free of the problem that an operator is unable to recognize a rectangular shape while viewing the projection surface obliquely, as is mentioned for Japanese Patent No. 3519393. However, if an image is projected onto a wall of a room or the like, then the operator alone is unable to make corrective adjustments because no screen frame is available for use as a reference for such adjustments.

SUMMARY OF THE INVENTION

It is an object of the present invention to provide a projector which allows a single operator to easily correct image distortions even if an image is projected at a large horizontal swing-and-tilt angle.

A projector apparatus according to the present invention comprises a projection device for projecting an image onto a projection surface; at least two displacement sensors for detecting horizontal displacements of the projector apparatus, the displacement sensors being spaced a predetermined distance from each other; a rotational angle calculator for calculating a rotational angle of the projector apparatus in a horizontal plane using the predetermined distance and the horizontal displacements, the horizontal displacements being detected by the displacement sensors; and a distortion corrector for correcting distortion of the image by using the rotational angle, the image being projected by the projection device, wherein the rotational angle is calculated by the rotational angle calculator as a horizontal corrective angle.

In one aspect of the present invention, a projector apparatus comprises a means for projecting an image onto a projection surface; a means for detecting horizontal displacements of at least two positions of said projector apparatus, said two positions being spaced a predetermined distance from each other; a means for calculating a rotational angle of said projector apparatus in a horizontal plane by using said predetermined distance and said horizontal displacements, said horizontal displacements being detected by said means for detecting horizontal displacements; and a means for correcting distortion of the image using the rotational angle, the image being projected by said means for projecting the image, wherein the rotational angle is calculated by said means for calculating the rotational angle as a horizontal corrective angle.

In another aspect of the present invention, a method for correcting distortion of an image that is projected by a projector apparatus comprises the steps of: detecting horizontal displacements of at least two positions of the projector apparatus, the two positions being spaced a predetermined distance from each other, wherein the displacements are caused by rotating said projector apparatus in a horizontal plane; calculating a rotational angle of said projector apparatus using said predetermined distance and the horizontal displacements which are detected, wherein the rotational angle is caused by rotating said projector in the horizontal plane; and correcting the distortion of the image that is projected by said projector apparatus, using the calculated rotational angle as a horizontal corrective angle.

The projector has at least two displacement sensors to detect horizontal displacements of the projector. When the projector is rotated horizontally, each displacement sensor detects a horizontal displacement of the projector. Since the projector calculates a horizontal swing-and-tilt angle as a horizontal corrective angle from the horizontal displacements which are detected, a distortion corrector of the projector can easily and automatically correct distortion of an image that is projected obliquely onto the projection plane. Specifically, the operator sets the projector such that the projection optical axis extends perpendicularly to the projection surface, and then rotates the projector by a desired angle in order to project an image onto the projection surface. Since the angle by which the projector is rotated is automatically detected, the distortion of the image which is caused by rotating the projector is also automatically corrected depending on the angle. When the operator rotates the projector, the operator does not need to take notice of the position of the axis about which the projector is rotated.

The projector may also have a tilt angle sensor for detecting the vertical tilt angle of the projector. The distortion corrector may use the vertical tilt angle, which is detected by the tilt angle sensor, as a vertical corrective angle to correct the distortion of the image that is projected by the projector. In this embodiment, the horizontal corrective angle can be acquired from the vertical corrective angle, which is acquired by the tilt angle sensor, and from the horizontal swing-and-tilt angle, which is calculated using the horizontal displacements which are detected by the displacement sensors.

The above and other objects, features, and advantages of the present invention will become apparent from the following description with reference to the accompanying drawings which illustrate an example of the present invention.

DESCRIPTION OF THE PREFERRED EMBODIMENT

A projector according to the present invention has a means for measuring a vertical angle and a means for measuring horizontal displacements of two locations. When the projector projects an image obliquely onto a projection surface, the projector can easily correct distortion of the image that is obliquely projected based on a horizontal swing-and-tilt angle, which is calculated from horizontal displacements when the projector is rotated horizontally, and a vertical tilt angle of the projector.

Figure 1:
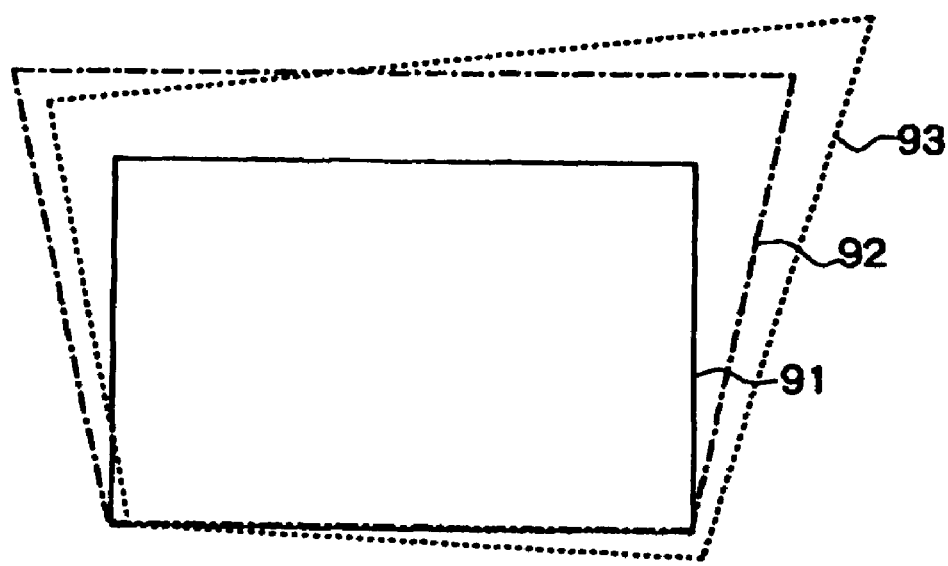
FIG. 1 is a schematic diagram showing an image that is projected at an upward angle alone, an image that is projected at a vertical swing-and-tilt projection angle, and an image that is projected at a horizontal swing-and-tilt projection angle.
Figure 2:
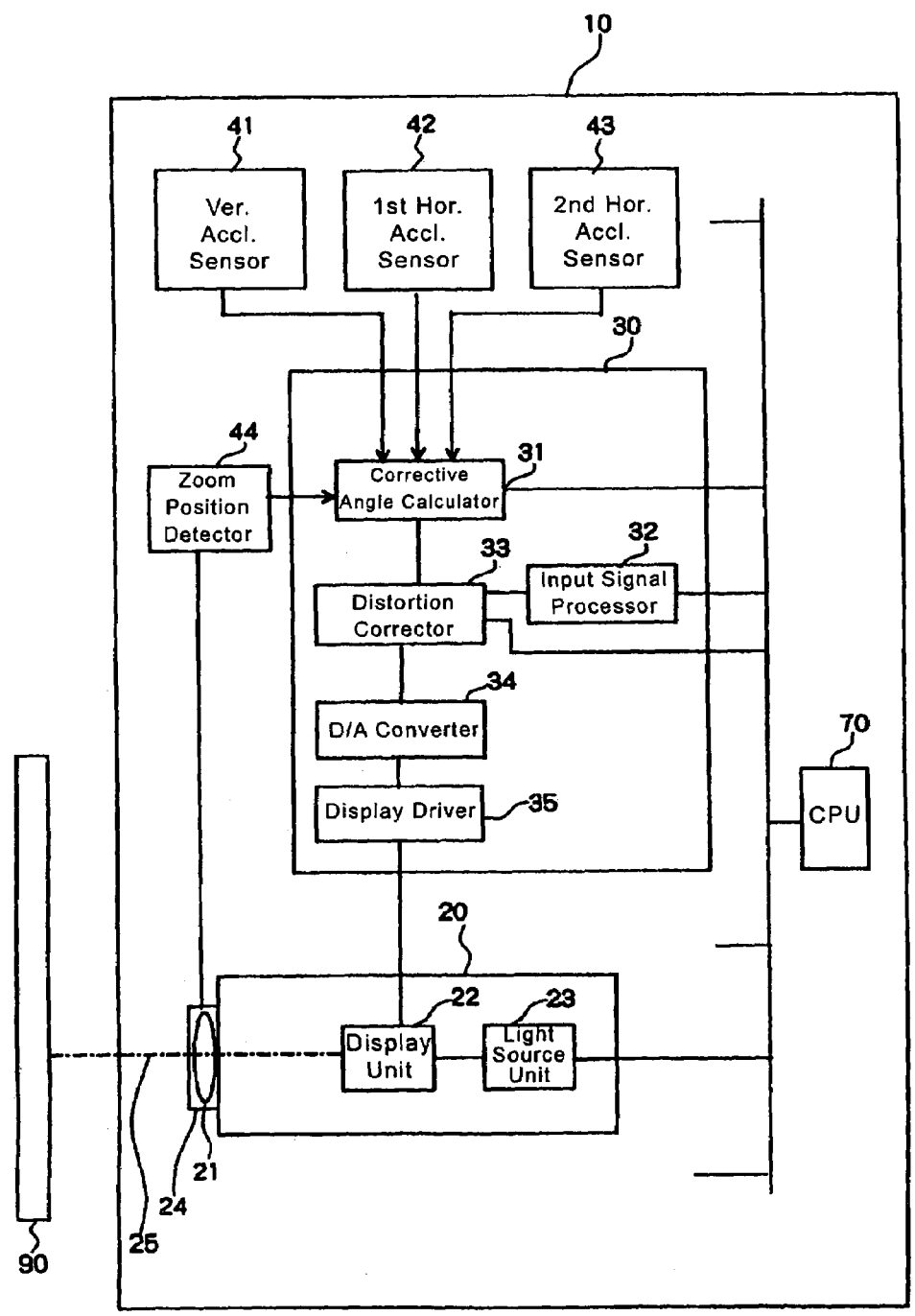
FIG. 2 is a block diagram of a projector according to an embodiment of the present invention.

A preferred embodiment of the present invention will be described below with reference to the drawings. FIG. 2 shows a projector according to a preferred embodiment of the present invention in block form. As shown in FIG. 2, projector 10 has projection device 20, image controller 30, vertical acceleration sensor 41, first horizontal acceleration sensor 42, second horizontal acceleration sensor 43, zoom position detector 44, and central processing unit 70 for controlling the overall operation of projector 10. Projection device 20 has projection lens 21 having optical zoom unit 24, display unit 22 for outputting an image, and light source unit 23. Image controller 30 controls the image on display unit 22, calculates tilt angles of projector 10 with respect to projection surface 90, and corrects distortion of the image that is displayed on display unit 22. Vertical acceleration sensor 41 detects a vertical tilt angle of projector 10. First and second horizontal acceleration sensors 42, 43 measure horizontal displacements of projector 10. Zoom position detector 44 detects a set position of optical zoom unit 24.

Image controller 30 has corrective angle calculator 31, input signal processor 32, distortion corrector 33, D/A (Digital/Analog) converter 34, and display driver 35. Corrective angle calculator 31 calculates a corrective angle based on information that includes a vertical tilt angle of projector 10, two horizontal displacements of projector 10, and a zoom position. The information is input from vertical acceleration sensor 41, first horizontal acceleration sensor 42, second horizontal acceleration sensor 43, and zoom position detector 44. Input signal processor 32 converts a supplied image signal into a digital image signal. Distortion corrector 33 corrects distortion of the digital image signal, which is supplied from input signal processor 32, based on the corrective angle calculated by corrective angle calculator 31. D/A converter 34 converts the digital image signal, the distortion of which is corrected, into an analog image signal. Display driver 35 drives display unit 22 of projection device 20 based on the analog image signal that is output from D/A converter 34.

Image controller 30 transforms the coordinates of the supplied image signal, which is stored in the form of a frame memory, based on the vertical and horizontal tilt angles of projector 10 and an adjusted position of optical zoom unit 24, and thereby controls the output image on display unit 22 to project distortion-free image from display unit 22 onto projection surface 90. These functions of projector 10 are based on technologies that have already been put into practical use, and will not be described in detail below. The distortion of an image is automatically corrected by central processing unit 70 according to a predetermined procedure. If the tilt angle does not need to be corrected based on the adjusted position of optical zoom unit 24, then zoom position detector 44 may be omitted.

According to the present embodiment, a vertical tilt angle is measured by vertical acceleration sensor 41, and horizontal displacements are measured by horizontal acceleration sensors 42, 43. However, they may be measured by any desired measuring means other than the illustrated acceleration sensors.

Figure 3A:
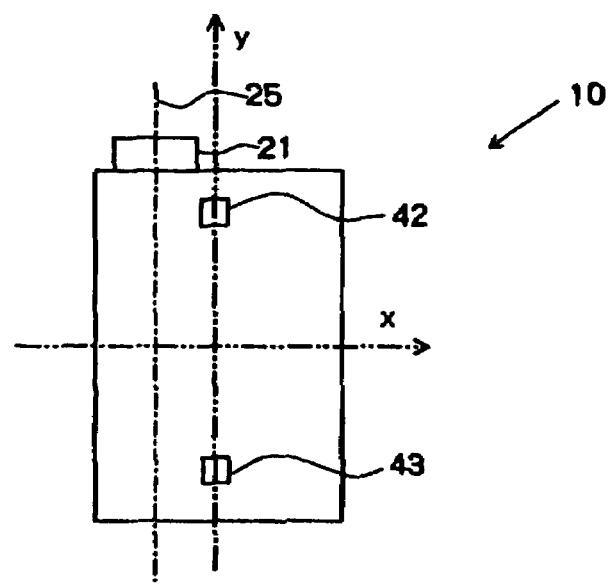
FIGS. 3A and 3B are schematic plan views of the projector.
Figure 3B:
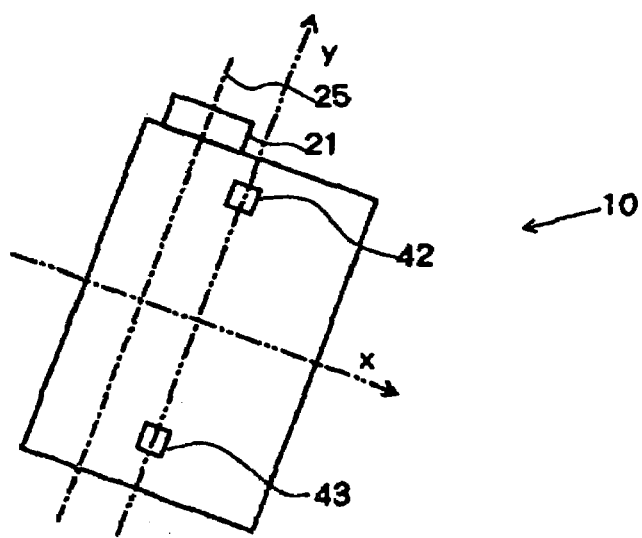
Figure 4:
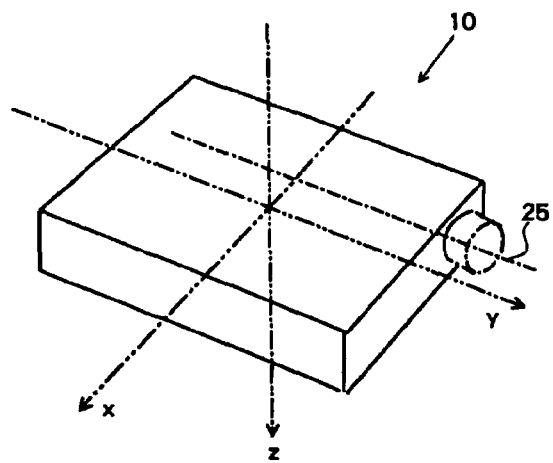
FIG. 4 is a schematic perspective view of the projector.

FIG. 3A is a schematic plan view of projector when it is installed such that the projection optical axis of the projector extends perpendicularly to the projection surface in the horizontal plane. FIG. 3B is a schematic plan view of projector when it is installed such that the projection optical axis of the projector is inclined about 30 degrees clockwise with respect to the projection surface. First horizontal acceleration sensor 42 and second horizontal acceleration sensor 43 are mounted at front and rear locations on projector 10, respectively, such that the line that interconnects first and second horizontal acceleration sensors 42, 43 extends parallel to projection optical axis 25 of projection lens 21. First and second horizontal acceleration sensors 42, 43 are preferably arranged on the longitudinal central axis of projector 10 which includes the center of projector 10 about which projector 10 is usually rotated. In this specification, an axis of projector 10 which lies parallel to projection optical axis 25 of projection lens 21 is referred to as "y-axis", and an axis of projector 10 which lies in the horizontal plane that includes the y-axis and which is perpendicular to the y-axis is referred to as "x-axis". First horizontal acceleration sensor 42 and second horizontal acceleration sensor 43 are two-axis sensors which are capable of detecting accelerations in the x- and y-axis directions, and are disposed such that they produce a signal of positive polarity when they move to the right along the x-axis and that they produce a signal of positive polarity when they move forwards along the y-axis. Therefore, when projector 10 is rotated from the position shown in FIG. 3A to the position shown in FIG. 3B, first horizontal acceleration sensor 42 and second horizontal acceleration sensor 43 output signals of opposite polarities for both x- and y-axis directions. Though first horizontal acceleration sensor 42 and second horizontal acceleration sensor 43 are two-axis sensors in the embodiment, they may be capable of detecting only acceleration along the x-axis. The rotational angle of projector 10 can also be calculated using such sensors. If projector 10 is moved without being rotated, then first horizontal acceleration sensor 42 and second horizontal acceleration sensor 43 output signals of the same polarity. Vertical acceleration sensor 41 shown in FIG. 2 is not illustrated in FIGS. 3A and 3B, because there are no limitations on the location where the sensor is mounted. At least either of first horizontal acceleration sensor 42 and second horizontal acceleration sensor 43 may detect accelerations in three dimensions, i.e., along the x-axis, the y-axis, and the z-axis, which is perpendicular to both the x-axis and the y-axis, to function also as vertical acceleration sensor 41. FIG. 4 shows projector 10 in schematic perspective, with the vertical direction extending along the z-axis.

Operation of the components of projector 10 according to the present embodiment will be described below. When projector 10 is energized in the position shown in FIG. 3A, central processing unit 70 monitors output signals from vertical acceleration sensor 41, first horizontal acceleration sensor 42, and second horizontal acceleration sensor 43 through corrective angle calculator 31. If the state, in which all of the output signals of first horizontal acceleration sensor 42 and second horizontal acceleration sensor 43 is equal to or smaller than a threshold value, continues for a threshold period or longer, then central processing unit 70 judges that projector 10 is kept stationary, and initializes the horizontal swing-and-tilt angle of projector 10 at the time to 0 degree.

When projector 10 is installed obliquely to projection surface 90, the components of projector 10 operate as follows. If upward swing-and-tilt projection is required, then an operator adjusts a vertical swing-and-tilt angle by extending the tilt foot of projector 10. Thereafter, the operator adjusts the horizontal orientation of projector 10 such that projection optical axis 25 is directed perpendicularly to projection surface 90. Then, projector 10 is kept stationary for more than the threshold period (e.g., 2 seconds). Central processing unit 70 monitors the state of projector 10 through corrective angle calculator 31, judges that projector 10 is kept stationary, and initializes the horizontal swing-and-tilt angle at the time to 0 degree. Thereafter, the operator rotates projector 10, for example, clockwise by a desired swing-and-tilt angle, as shown in FIG. 3B.

Figure 5A:
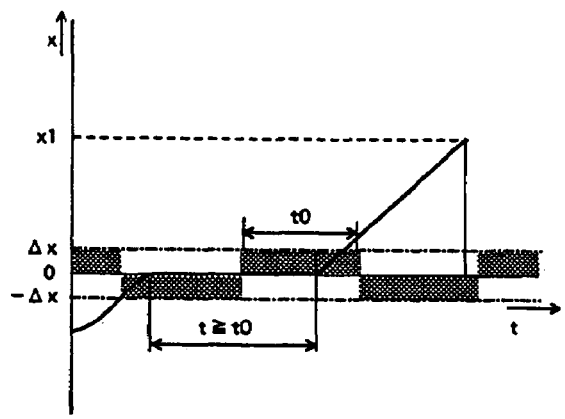
FIG. 5A is a graph showing the relationship between the x-axis output of the first horizontal acceleration sensor and time.
Figure 5B:
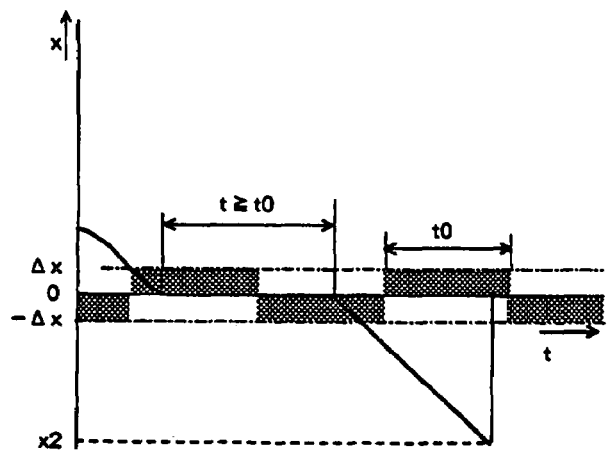
FIG. 5B is a graph showing the relationship between the x-axis output of the second horizontal acceleration sensor and time.

FIG. 5A is, a graph showing the relationship between the x-axis output of first horizontal acceleration sensor 42 and time. FIG. 5B is a graph showing the relationship between the x-axis output of second horizontal acceleration sensor 43 and time. In FIGS. 5A and 5B, coordinate x represents the output of the horizontal acceleration sensor when it is moved, coordinate t represents time, Δx represents the threshold value of the x-axis output of the horizontal acceleration sensor, and t0 represents the threshold period. If period t, for which both the absolute values of the x-axis outputs of first horizontal acceleration sensor 42 and second horizontal acceleration sensor 43 are equal to or smaller than threshold value Δx, is longer than t0, then central processing unit 70 judges that projector 10 is kept stationary, and initializes the horizontal swing-and-tilt angle to 0 degree. When projector 10 is thereafter rotated by a desired horizontal swing-and-tilt angle, the outputs of first horizontal acceleration sensor 42 and second horizontal acceleration sensor 43 are increased to the maximum values x1, x2 of opposite polarities. If the x-axis outputs of first horizontal acceleration sensor 42 and second horizontal acceleration sensor 43 are of the same polarity, then central processing unit 70 judges that projector 10 is moved without being rotated, and will not perform the process described below.

Assume that the operator rotates projector 10 about a mechanical center thereof when projector 10 is rotated from the position shown in FIG. 3A to the position shown in FIG. 3B. Since projectors which are designed for portability usually have the mechanical center at the center of gravity of the projector, it is thought that projectors are usually rotated about the mechanical center. Assume that first horizontal acceleration sensor 42 and second horizontal acceleration sensor 43 are arranged equidistant from the center of rotation, which lies on the central line that is parallel to projection optical axis 25 of projection lens 21. If projector 10 is rotated about an intermediate point that is equidistant from first horizontal acceleration sensor 42 and second horizontal acceleration sensor 43, then the maximum output values x1, x2 are of opposite polarities and have the same absolute value. For an easier understanding of the present invention, the explanation will be given on this assumption first, and the embodiment in which projector 10 is rotated about a non-equidistant point will be described later. The y-axis outputs of first horizontal acceleration sensor 42 and second horizontal acceleration sensor 43 are similar to the x-axis outputs thereof. The explanation of the y-axis outputs will be omitted because they are not directly required for the calculation of rotational angles.

Figure 6:
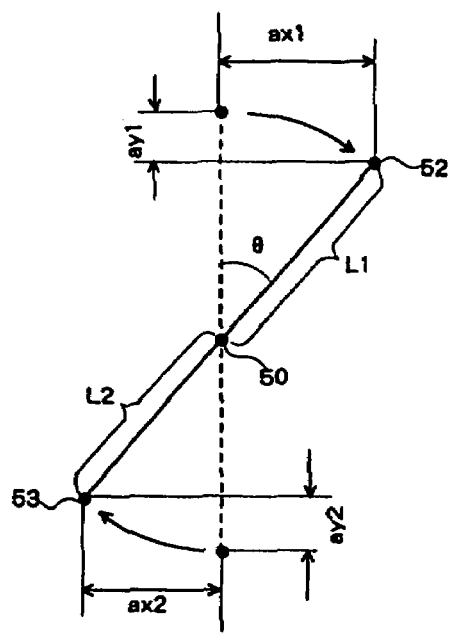
FIG. 6 is a diagram illustrating a process of determining a rotational angle of the projector from displacements x1, x2 detected by the horizontal acceleration sensors.

A process of determining a rotational angle of projector 10 by using displacements x1, x2, which are detected by horizontal acceleration sensors 42, 43 when projector 10 is rotated horizontally, will be described below with reference to FIG. 6. In FIG. 6, the broken line represents a reference line of projector 10, which shows the position of projector 10 prior to rotation, when it is judged that projector 10 is kept stationary. When projector 10 is rotated, first horizontal acceleration sensor 42 comes to position 52, and second horizontal acceleration sensor 43 comes to position 53. If center of rotation 50 is on the mechanical center of projector 10 and if first horizontal acceleration sensor 42 and second horizontal acceleration sensor 43 are arranged equidistant from center of rotation 50, then distance L1 between position 52 of first horizontal acceleration sensor 42 and center 50, and distance L2 between position 53 of second horizontal acceleration sensor 43 and center 50 are equal to each other, making it easy to calculate the horizontal swing-and-tilt angle (rotational angle) θ. In FIG. 6, ax1 represents the product of x-axis output x1 of first horizontal acceleration sensor 42, which is described above with reference to FIG. 5A, and coefficient a, and ay1 represents the product of y-axis output y1 of first horizontal acceleration sensor 42 and coefficient a. Similarly, ax2 represents the product of the x-axis output of second horizontal acceleration sensor 43, which is described above with reference to FIG. 5B, and coefficient a, and ay2 represents the product of y-axis output of second horizontal acceleration sensor 43 and coefficient a. In FIG. 6, ax1 is equal to ax2. Coefficient a converts the outputs of the acceleration sensors into displacements along the x- and y-axes. Horizontal swing-and-tilt angle θ is trigonometrically determined from displacements ax1, ax2 along the x-axis and distances L1, L2. In this way, the horizontal swing-and-tilt angle can be determined. The vertical tilt angle of projector 10 can be determined from vertical acceleration sensor 41.

Distortion that occurs when the image is projected obliquely onto projection surface 90 can easily be corrected by distortion corrector 33 using inverse correction of the image that is displayed on display unit 22. Specifically, using the vertical tilt angle and the horizontal swing-and-tilt angle, the three-dimensional coordinate system, as viewed from the lens center of projector 10, is transformed into a three-dimensional coordinate system, as viewed from the direction that is perpendicular to projection surface 90, i.e., from the location of viewers, resulting in a corrected image.

Figure 7A:
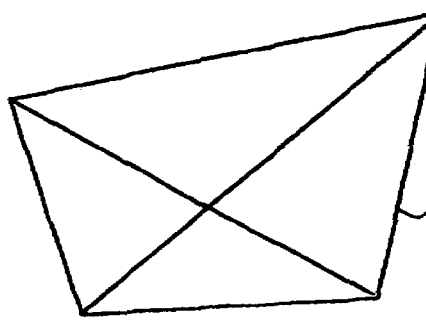
FIGS. 7A through 7D are diagrams showing images which are projected obliquely onto a projection surface, before and after they are corrected, and images which are displayed on a display unit, before and after they are corrected.
Figure 7B:
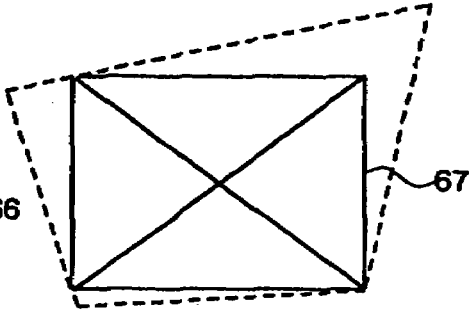
Figure 7C:
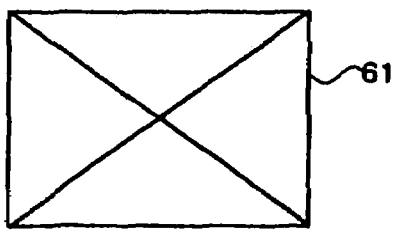
Figure 7D:
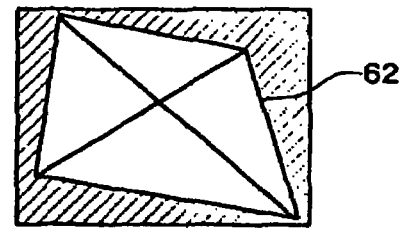

FIG. 7A shows an uncorrected image which is projected obliquely onto the projection surface. FIG. 7B shows a corrected image which is projected obliquely onto the projection surface. FIG. 7C shows an uncorrected image which is displayed on the display unit. FIG. 7D shows a corrected image which is displayed on the display unit. Image 66 shown in FIG. 7A is an uncorrected image which is projected onto projection surface 90. Image 67 shown in FIG. 7B is a corrected image which is projected onto projection surface 90. Image 61 shown in FIG. 7C is an uncorrected image which is displayed on display unit 22. Image 62 shown in FIG. 7D is a corrected image which is displayed on display unit 22.

If the projector is rotated about the mechanical center, as described above, then a single acceleration sensor which is mounted in the mechanically central position will be enough to detect a rotational angle. However, in actual situations, when the projector is set obliquely, the operator often rotates the projector about an axis near the projection lens in order to limit the movement of the projected image so as to easily project the image onto a desired position. Further, a terminal, which connects a personal computer or the like for serving as a signal source to the projector, is often provided on a side surface or on a rear surface of the projector. If a connection cable that is connected to the terminal is not long enough, then the projector will have to be rotated about the rear portion of the projector. In these situations, if a single acceleration sensor alone is mounted in the mechanically central position in order to detect a rotational angle, then it is impossible to accurately detect a rotational angle of the projector, possibly resulting in an image that is projected with a large distortion.

Figure 8A:
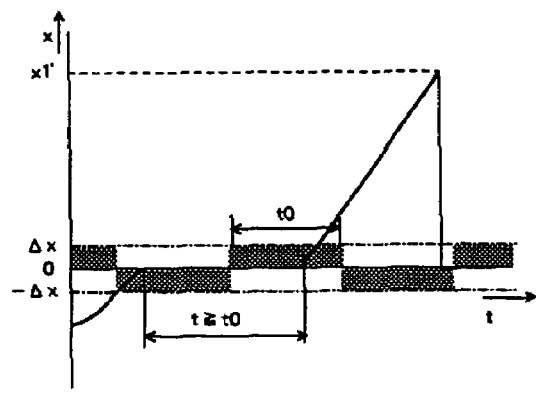
FIG. 8A is a graph showing the relationship between the x-axis output of the first horizontal acceleration sensor and time when the projector is rotated about an axis behind the center of the projector.
Figure 8B:
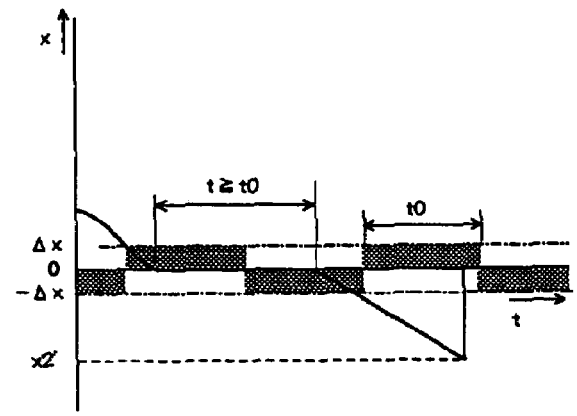
FIG. 8B is a graph showing the relationship between the x-axis output of the second horizontal acceleration sensor and time at the time the projector is rotated about the axis behind the center of the projector.
Figure 9:
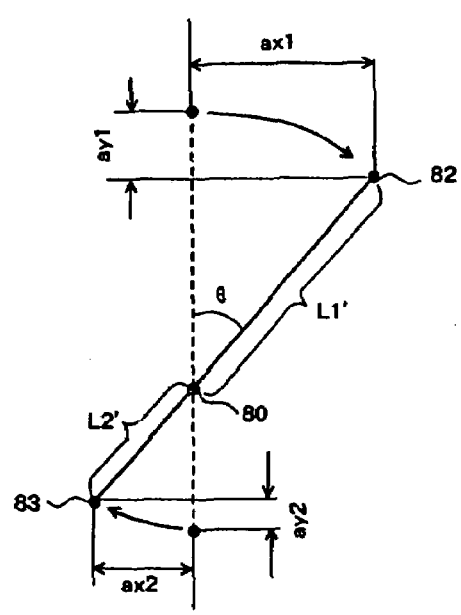
FIG. 9 is a diagram illustrating a process of determining a rotational angle of the projector from displacements x1', x2' detected by the horizontal acceleration sensors when the projector is rotated about the axis positioned behind the center of the projector.

Assume that the operator rotates projector 10 about an axis which is not on the mechanical center of projector 10. FIGS. 8A and 8B are graphs showing the relationship between the x-axis outputs of the first and second horizontal acceleration sensors and time when the operator rotates the projector about an axis that is behind the center of the projector. FIG. 9 is a diagram for this case illustrating a process of determining a rotational angle of the projector using displacements x1', x2' which are detected by the horizontal acceleration sensors.

In this case, the absolute value of the output of first horizontal acceleration sensor 42, which is arranged in front of the center of projector 10, is greater than the absolute value of the output of second horizontal acceleration sensor 43, which is arranged behind the center of projector 10. The ratio of ax1', which is the product of the x-axis output of first horizontal acceleration sensor 42 and a coefficient, to ax2', which is the product of the x-axis output of second horizontal acceleration sensor 43 and the coefficient is equal to the ratio of distance L1', which is the distance between first horizontal acceleration sensor 42 and center of rotation 80 after first horizontal acceleration sensor 42 has been moved, to distance L2', which is the distance between second horizontal acceleration sensor 43 and center of rotation 80 after second horizontal acceleration sensor 43 has been moved. Since the distance between first horizontal acceleration sensor 42 and second horizontal acceleration sensor 43 is known, distance L1' can be determined. Accordingly, angle θ is trigonometrically determined, and distortion of an obliquely projected image can be corrected in the same manner as described above with reference to FIG. 6. In this way, when projector 10 is rotated horizontally, the rotational angle of projector 10 can accurately be acquired even if the operator rotates projector 10 without taking notice of the position of the center of rotation of projector 10.

The distortion of a projected image is produced not only by vertical and horizontal tilts of projection optical axis 25 with respect to projection surface 90, but also by zooming of projection lens 21. Therefore, it is necessary to correct an image distortion that is produced by zooming. An image distortion produced by zooming is corrected by controlling the image processing LSI (Large Scale Integrated circuit) using the zooming quantity or zoom position as a parameter. Such a process for correcting distortion is known in the art. In the present embodiment, as shown in FIG. 2, corrective angle calculator 31 corrects the corrective angle based on the output from zoom position detector 44, and distortion corrector 33 adjusts the distortion correcting parameter.

Figure 10:
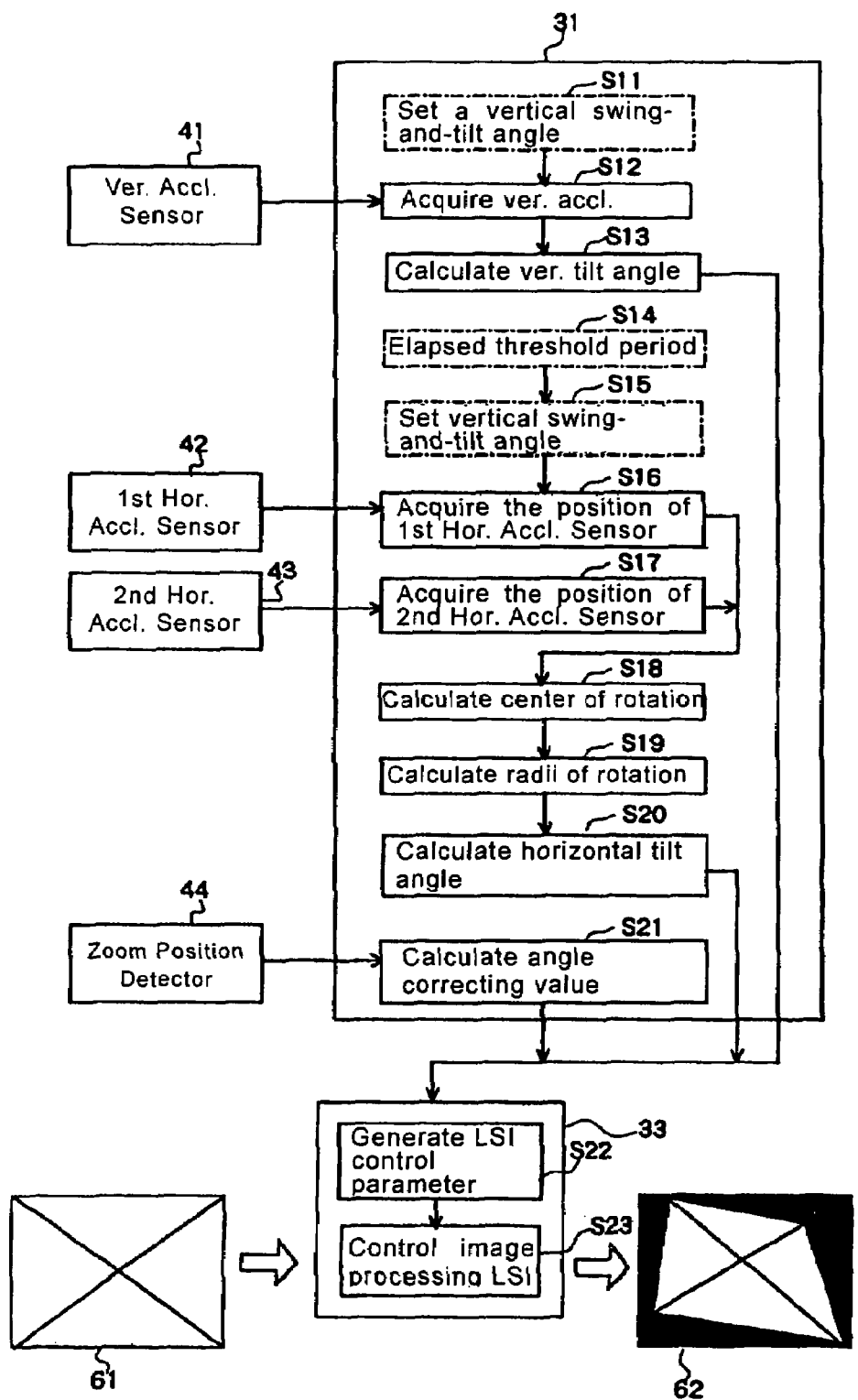
FIG. 10 is a flowchart of a process for correcting an output image on the display unit.

FIG. 10 is a flowchart of a process for correcting an output image on the display unit based on the information that is measured by the vertical acceleration sensor, the first horizontal acceleration sensor, the second horizontal acceleration sensor, and the zoom position detector.

First, at step S11, a vertical swing-and-tilt angle of projector 10 is set while projection optical axis 25 extends perpendicularly to projection surface 90 in the horizontal plane. Then, at step S12, vertical acceleration sensor 41 detects the acceleration value in the vertical direction when vertical acceleration sensor 41 is rotated vertically. At step S13, corrective angle calculator 31 calculates a vertical tilt angle from the acceleration value that is acquired, and outputs the calculated vertical tilt angle to distortion corrector 33. After corrective angle calculator 31 confirms that the threshold period elapses at step S14, projector 10 is rotated horizontally to set the horizontal swing-and-tilt angle of projector 10 at step S15. Corrective angle calculator 31 acquires the position of first horizontal acceleration sensor 42, at step S16, when first horizontal acceleration sensor 42 is moved horizontally, and acquires the position of second horizontal acceleration sensor 43, at step S17, when second horizontal acceleration sensor 43 is moved, horizontally. Then, at step S18, corrective angle calculator 31 calculates the position of the center of rotation from the positions of the two sensors. Then, at step S19, corrective angle calculator 31 calculates the radii of rotation of the sensors. Then, at step S20, corrective angle calculator 31 calculates the horizontal tilt angle from the radii of rotation of the sensors and the moving distances of the sensors, and outputs the calculated horizontal tilt angle to distortion corrector 33. Corrective angle calculator 31 also calculates an angle correcting value from the zoom position that is detected by zoom position detector 44, and outputs the calculated angle correcting value to distortion corrector 33 at step S21.

Distortion corrector 33 receives the horizontal tilt angle, the vertical tilt angle, and the angle correcting value that are calculated, and generates an LSI control parameter at step S22, then controls the image processing LSI at step S23. Uncorrected input image 61 is now corrected, and display unit 22 displays corrected output image 62, which is projected onto projection surface 90. Corrected image 67 shown in FIG. 7B, which is similar to input image 61, is now displayed on projection surface 90.

In the present embodiment, first horizontal acceleration sensor 42 and second horizontal acceleration sensor 43 are mounted on projector 10 such that the line that interconnects first and second horizontal acceleration sensors 42, 43 extends parallel to the y-axis, i.e., projection optical axis 25 of projection lens 21. This is because if projector 10 is elongate along projection optical axis 25, two horizontal acceleration sensors 42, 43 will be sufficiently spaced from each other, and the rotational angle can be accurately detected. If the accuracy in detecting the rotational angle is sufficient, then horizontal acceleration sensors 42, 43 may be disposed along the x-axis, i.e., in a direction that is perpendicular to projection optical axis 25. If projector 10 is elongate in a direction that is perpendicular to projection optical axis 25, then the rotational angle will be detected with greater accuracy by arranging horizontal acceleration sensors 42, 43 along the x-axis.

According to the present embodiment, as described above, the outputs of horizontal acceleration sensors 42, 43 are monitored, and if the state, in which all of the outputs of horizontal acceleration sensors 42, 43 is equal to or smaller than a threshold value, continues for a threshold period or longer, then it is judged that projector 10 is kept stationary, and the horizontal swing-and-tilt angle of projector 10 is initialized to 0 degree. However, the horizontal swing-and-tilt angle of projector 10 may be initialized by pressing a button etc. after projector 10 is set such that projection optical axis 25 extends perpendicularly to projection surface 90 in the horizontal plane and before projector 10 is rotated horizontally.

As described above, according to the present embodiment, when projector 10 is rotated obliquely, the vertical tilt angle of projector 10 is adjusted first, and then projector 10 is set such that projection optical axis 25 extends perpendicularly to projection surface 90 in the horizontal plane, and after projector 10 is kept stationary for more than the threshold period, i.e., after the horizontal swing-and-tilt angle of projector 10 is initialized to 0 degree, projector 10 is rotated. However, projector 10 may be set first such that projection optical axis 25 extends perpendicularly to projection surface 90 in the horizontal plane, then projector 10 may be kept stationary for more than the threshold period, and then projector 10 may be rotated horizontally by a desired swing-and-tilt angle. In this case, before it is judged that projector 10 is kept stationary and the horizontal swing-and-tilt angle is initialized to 0 degree, the horizontal swing-and-tilt angle is preferably stored in a memory. Even when an adjustment is made for horizontal rotational movement first and then the vertical angle is adjusted, image distortion can be corrected by using the horizontal swing-and-tilt angle that is stored.

According to the present embodiment, a single vertical acceleration sensor is employed. However, two or more vertical acceleration sensors may be employed and the outputs may be averaged to measure a vertical rotational angle of the projector more accurately. Similarly, though two horizontal acceleration sensors are employed in the present embodiment, three or more horizontal acceleration sensors may be provided on two orthogonal axes in order to acquire a horizontal rotational angle of the projector more accurately.

Although a certain preferred embodiments of the present invention have been shown and described in detail, it should be understood that various changes and modifications may be made without departing from the spirit or scope of the appended claims.

What is claimed is:

1. A projector apparatus comprising:
    a projection device for projecting an image onto a projection surface;
    at least two acceleration sensors for detecting horizontal displacements of said projector apparatus, said acceleration sensors being spaced a predetermined distance from each other;
    a rotational angle calculator for calculating a rotational angle of the projector apparatus in a horizontal plane, according to the predetermined distance and the horizontal displacements detected by said acceleration sensors; and
    a distortion corrector for correcting distortion of the image, according to the rotational angle, the image being projected by said projection device, wherein the rotational angle is calculated by said rotational angle calculator as a horizontal corrective angle.

2. The projector apparatus according to claim 1, further comprising:
a tilt angle sensor for detecting a vertical tilt angle of the projector;
wherein said distortion corrector corrects the distortion of the image according to the vertical tilt angle, the image being projected by said projection device, wherein the vertical tilt angle is detected by said tilt angle sensor as a vertical corrective angle.

3. The projector apparatus according to claim 2, wherein said tilt angle sensor comprises a vertical acceleration sensor.

4. A projector apparatus comprising:
a projection device for projecting an image onto a projection surface:
at least two displacement sensors for detecting horizontal displacements of said projector apparatus, said displacement sensors being spaced a predetermined distance from each other;
a rotational angle calculator for calculating a rotational angle of the projector apparatus in a horizontal plane, according to the predetermined distance and the horizontal displacements, the horizontal displacements being detected by said displacement sensors; and
a distortion corrector for correcting distortion of the image according to the rotational angle, the image being projected by said projection device, wherein the rotational angle is calculated by said rotational angle calculator as a horizontal corrective angle,
wherein said displacement sensors comprise two horizontal acceleration sensors,
wherein said horizontal acceleration sensors are arranged in front and in rear positions, respectively, being spaced along a projection optical axis of said projection device, and are arranged in a plane that is parallel to a vertical plane that includes said projection optical axis, and
wherein each horizontal acceleration sensor detects the horizontal displacement in a direction that is perpendicular to said projection optical axis.

5. A projector apparatus comprising:
a projection device for projecting an image onto a projection surface;
at least two displacement sensors for detecting horizontal displacements of said projector apparatus, said displacement sensors being spaced a predetermined distance from each other;
a rotational angle calculator for calculating a rotational angle of the projector apparatus in a horizontal plane, according to the predetermined distance and the horizontal displacements, the horizontal displacements being detected by said displacement sensors; and
a distortion corrector for correcting distortion of the image, according to the rotational angle, the image being projected by said projection device, wherein the rotational angle is calculated by said rotational angle calculator as a horizontal corrective angle,
wherein said displacement sensors comprise two horizontal acceleration sensors,
wherein said horizontal acceleration sensors are spaced on both sides of a projection optical axis of said projection device, and are arranged in a vertical plane that is perpendicular to a vertical plane that includes said projection optical axis, and
wherein each horizontal acceleration sensor detects the horizontal displacement in a direction that is parallel to said projection optical axis.

6. The projector apparatus according to claim 1, further comprising:
a zoom position sensor for detecting an adjusted position of an optical zoom unit of a projection lens of said projection device;
wherein said rotational angle calculator calculates a zoom correcting angle based on the adjusted position of the optical zoom unit detected by said zoom position sensor; and
wherein said distortion corrector corrects the distortion of the image that is projected by said projection device based on the zoom correcting angle calculated by said rotational angle calculator.

7. A projector apparatus comprising:
means for projecting an image onto a projection surface;
means for detecting horizontal displacements of at least two positions of said projector apparatus, by sensing acceleration at the two positions, said two positions being spaced a predetermined distance from each other;
means for calculating a rotational angle of said projector apparatus in a horizontal plane according to said predetermined distance and said horizontal displacements, said horizontal displacements being detected by said means for detecting horizontal displacements; and
means for correcting distortion of the image according to the rotational angle, the image being projected by said means for projecting the image, wherein the rotational angle is calculated by said means for calculating the rotational angle as a horizontal corrective angle.

8. A method for correcting distortion of an image that is projected by a projector apparatus, comprising:
detecting horizontal displacements of at least two positions of the projector apparatus, by sensing acceleration at the two positions, the two positions being spaced a predetermined distance from each other, wherein the displacements include rotating said projector apparatus in a horizontal plane;
calculating a rotational angle of said projector apparatus according to said predetermined distance and the horizontal displacements which are detected, wherein the rotational angle includes the rotation of said projector apparatus in the horizontal plane; and
correcting the distortion of the image projected by said projector apparatus, according to the calculated rotational angle as a horizontal corrective angle.

9. The projector apparatus according to claim 7, wherein said means for detecting horizontal displacements comprises two horizontal acceleration sensors arranged one of parallel and perpendicular to the optical axis.

10. The projector apparatus according to claim 7, wherein said means for detecting horizontal displacements comprises at least two horizontal acceleration sensors detecting horizontal angles in a direction that is one of parallel and perpendicular to said projection optical axis.

11. The projector apparatus according to claim 7, wherein said means for detecting horizontal displacements comprises two horizontal acceleration sensors arranged in front and in rear positions, respectively, being spaced along a projection optical axis of said means for projecting, and are arranged in a plane that is parallel to a vertical plane that includes said projection optical axis, and each horizontal acceleration sensor detects the horizontal displacement in a direction that is perpendicular to said projection optical axis.

12. The projector apparatus according to claim 7, wherein said means for detecting horizontal displacements comprises two horizontal acceleration sensors spaced on sides of a projection optical axis of said projection device, and are arranged in a vertical plane that is perpendicular to a vertical plane that includes said projection optical axis, and wherein each horizontal acceleration sensor detects the horizontal displacement in a direction that is parallel to said projection optical axis.

13. The method according to claim 8, wherein said detecting of horizontal displacements further comprises:
    detecting by at least two horizontal acceleration sensors, the horizontal displacement being in a direction that is perpendicular to a projection optical axis of said projector apparatus,
    wherein said horizontal acceleration sensors are arranged in front and in rear positions, respectively, being spaced along a projection optical axis of said projector apparatus, and are arranged in a plane that is parallel to a vertical plane that includes said projection optical axis.

14. The method according to claim 8, wherein said detecting of horizontal displacements further comprises:
    detecting by at least two horizontal acceleration sensors, the horizontal displacements in a direction that are parallel to said projection optical axis,
    wherein said horizontal acceleration sensors are spaced on both sides of a projection optical axis of said projector apparatus, and are arranged in a vertical plane that is perpendicular to a vertical plane that includes said projection optical axis.

15. The method according to claim 8, wherein said detecting of horizontal displacements further comprises detecting horizontal angles in a direction that is one of parallel and perpendicular to said projection optical axis.

16. The projector apparatus according to claim 1, wherein said acceleration sensors are arranged one of substantially parallel and substantially perpendicular to an optical axis of the projector apparatus.

17. The projector apparatus according to claim 1, wherein said horizontal acceleration sensors are spaced on both sides of a projection optical axis of said projection device, and are arranged in a vertical plane that is one of a perpendicular direction and a parallel direction to a vertical plane that includes said projection optical axis, and
    wherein each horizontal acceleration sensor detects the horizontal displacement in a direction that is the other one of the perpendicular direction and the parallel direction to said projection optical axis.

18. The projector apparatus according to claim 1, wherein said distortion corrector corrects the distortion of the image according to the rotational angle and a vertical tilt angle of the projector apparatus.

19. The projector apparatus according to claim 1, wherein the rotational angle calculator and the distortion corrector are integrated into a controller.

20. The projector apparatus according to claim 1, wherein:
    the rotational angle calculator and the distortion corrector are integrated into a single image controller with a display driver of the projection device, and
    said sensors and said image controller are managed by a central processing unit.

* * * * *